US008223696B2

(12) United States Patent
Ishii et al.

(10) Patent No.: US 8,223,696 B2
(45) Date of Patent: Jul. 17, 2012

(54) HANDOVER CONTROLLING METHOD, RADIO BASE STATION, AND MOBILE STATION

(75) Inventors: Minami Ishii, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/673,660

(22) PCT Filed: Aug. 15, 2008

(86) PCT No.: PCT/JP2008/064622
§ 371 (c)(1),
(2), (4) Date: May 4, 2010

(87) PCT Pub. No.: WO2009/022735
PCT Pub. Date: Feb. 19, 2009

(65) Prior Publication Data
US 2011/0019642 A1    Jan. 27, 2011

(30) Foreign Application Priority Data

Aug. 16, 2007   (JP) ................................ P2007-212506

(51) Int. Cl.
*H04Q 7/00* (2006.01)
*H04J 3/06* (2006.01)
(52) U.S. Cl. .................... 370/328; 370/331; 370/503
(58) Field of Classification Search .................. 370/328, 370/331, 503
See application file for complete search history.

(56) References Cited

U.S. PATENT DOCUMENTS

| 7,532,889 | B2 | 5/2009 | Kim | |
|---|---|---|---|---|
| 2002/0057667 | A1* | 5/2002 | Hamalainen et al. | 370/347 |
| 2003/0211848 | A1* | 11/2003 | Rajkotia et al. | 455/436 |
| 2005/0239465 | A1* | 10/2005 | Lee et al. | 455/436 |
| 2007/0291699 | A1* | 12/2007 | Lee et al. | 370/332 |
| 2008/0267131 | A1* | 10/2008 | Kangude et al. | 370/331 |
| 2009/0247163 | A1 | 10/2009 | Aoyama | |
| 2009/0275319 | A1 | 11/2009 | Aoyama et al. | |
| 2010/0029276 | A1* | 2/2010 | Hwang | 455/436 |

FOREIGN PATENT DOCUMENTS

| JP | 11-103489 A | 4/1999 |
|---|---|---|
| KR | 2006-0116901 A | 11/2006 |

(Continued)

OTHER PUBLICATIONS

Japanese Office Action for Application No. 2007-212506, mailed on Apr. 20, 2010 (3 pages).

(Continued)

*Primary Examiner* — Andrew Lee
(74) *Attorney, Agent, or Firm* — Osha Liang LLP (57) ABSTRACT

A radio base station (200A) according to the present invention includes: a radio related information retainer unit (206) configured to retain radio related information on connection between a mobile station (100) and the radio base station (200A); a handover request signal generator/transmitter unit (208) configured to transmit a handover request signal including the radio related information retained by the radio related information retainer unit (206) to a connection target radio base station (200B); and a handover command signal generator/transmitter unit (202) configured to transmit, to the mobile station, a handover command signal for notifying difference information between the radio related information retained by the radio related information retainer unit (206) and radio related information set by the connection target radio base station (200B) based on a handover request acknowledgment signal.

3 Claims, 6 Drawing Sheets

FOREIGN PATENT DOCUMENTS

| WO | 2007/020997 A1 | 2/2007 |
| WO | 2007/111265 A1 | 10/2007 |

OTHER PUBLICATIONS

Patent Abstracts of Japan for Japanese Publication No. 11-103489, publication date Apr. 13, 1999 (1 page).

3GPP TS 36.300 V8.1.0 (Jun. 2007), Evolved Universal Terrestrial Radio Access (E-UTRA) and Evolved Universal Terrestrial Radio Access Network (E-UTRAN), Overall description; Stage 2 (Release 8), paragraph 10.1.2, 7 pages.

3GPP TS 36.300 V8.0.0 (Mar. 2007), Evolved Universal Terrestrial Radio Access (E-UTRA) and Evolved Universal Terrestrial Radio Access Network (E-UTRAN), 82 pages.

International Search Report issued in PCT/JP2008/064622, mailed on Sep. 9, 2008, with translation, 4 pages.

Written Opinion issued in PCT/JP2008/064622, mailed on Sep. 9, 2008, 3 pages.

Japanese Office Action for Application No. 2007-212506, mailed on Aug. 10, 2010 (4 pages).

Japanese Office Action for Application No. 2007-212506, mailed on Sep. 28, 2010 (6 pages).

Office Action for Korean Application No. 2010-7003066 mailed Jan. 19, 2012, with English translation thereof (7 pages).

Patent abstract for Korean Publication No. 2006-0116901 Published Nov. 16, 2006 (1 page).

\* cited by examiner

| # | ITEM | RADIO RELATED INFORMATION OF CONNECTION SOURCE RADIO BASE STATION | RADIO RELATED INFORMATION OF CONNECTION TARGET RADIO BASE STATION | DIFFERENCE REQUIRED TO BE NEWLY NOTIFIED |
|---|---|---|---|---|
| 1 | MEASUREMENT CYCLE | 500ms | 100ms | 100ms |
| 2 | MEASUREMENT CONDITION | ALL DETECTED CELLS (Detected Cells) | ALL DETECTED CELLS (Detected Cells) | — |
| 3 | MEASUREMENT ITEM | RECEPTION LEVEL (RSRP: Reference signal received power) | RECEPTION QUALITY (RSRQ: Reference signal received quality) | RECEPTION QUALITY (RSRQ: Reference signal received quality) |
| 4 | HANDOVER START CONDITION | Event 1D | Event 1D | — |
| 5 | TIME HYSTERESIS | 500ms | 100ms | 100ms |
| 6 | LEVEL HYSTERESIS | 3dB | 3dB | — |
| 7 | Security algorithm | UEA2/UIA2 | UEA2/UIA2 | — |
| ... | ... | ... | ... | ... |

FIG.6

HANDOVER CONTROLLING METHOD, RADIO BASE STATION, AND MOBILE STATION

TECHNICAL FIELD

The present invention relates to a handover controlling method, a radio base station, and a mobile station.

BACKGROUND ART

A conventional mobile communication system allows a mobile station to continue communication while moving by performing handover control between the mobile station and a radio base station.

To be more precise, when a mobile station in communication is about to move beyond the service area (cell) of a radio base station, the mobile station reports its radio quality to the radio base station to which the mobile station is being connected.

The radio base station receives the radio quality and judges whether or not to cause the mobile station to switch to a cell in which the mobile station can communicate with better radio quality.

If judging that the switching of a cell is necessary as a result of the above judgment, the radio base station instructs the mobile station to switch the cell (a handover).

Figure 1:
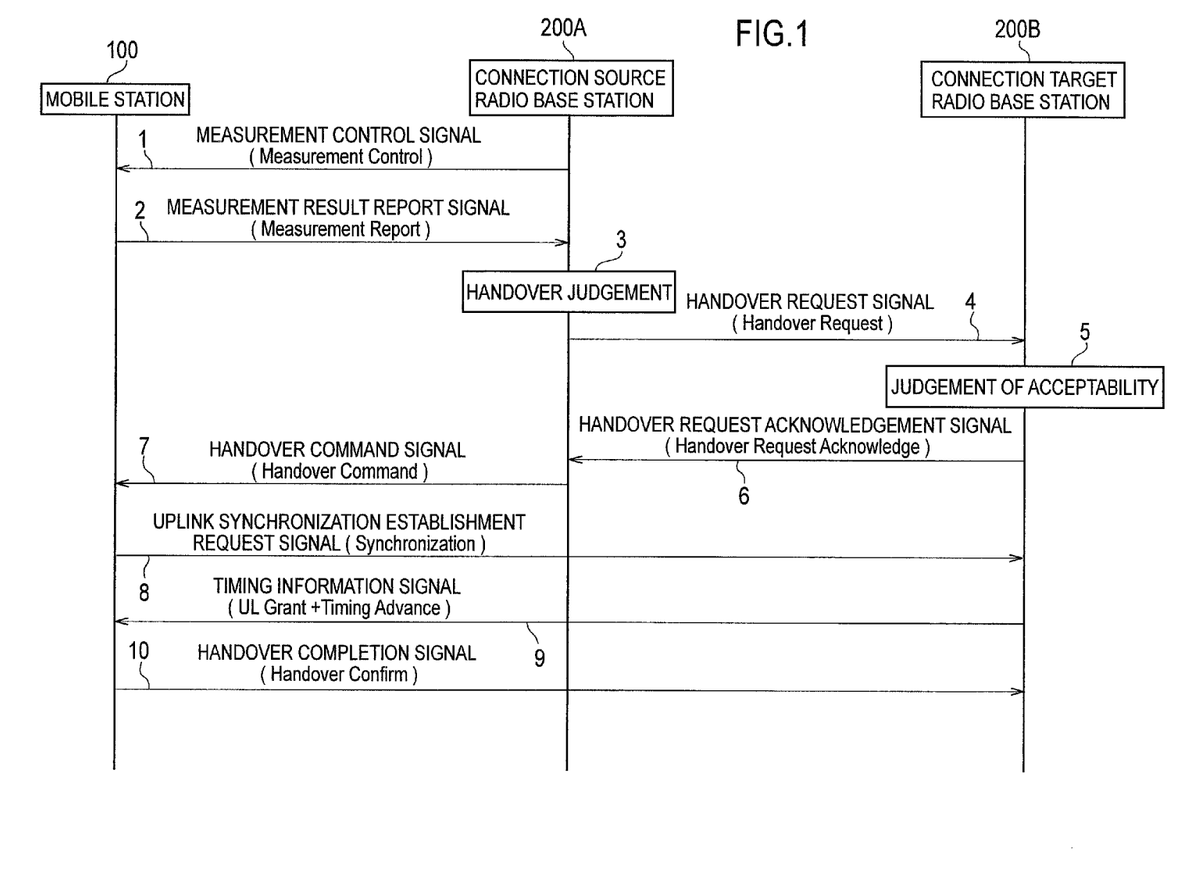
FIG. 1 is a flowchart showing an operation of a conventional mobile communication system.

For example, in a mobile communication system being studied as the Evolved universal terrestrial radio access network (E-UTRAN), a handover is carried out in accordance with procedures as shown in FIG. 1 (see Non-patent Document 1).

As shown in FIG. 1, in step 1, a connection source radio base station (Source eNB) 200A transmits a measurement control signal (Measurement Control) including a parameter concerning a radio quality measurement to a mobile station 100.

In step 2, when measured radio quality satisfies a condition for reporting, the mobile station 100 transmits a measurement result report signal (Measurement Report) including the measurement result to the connection source radio base station 200A.

In step 3, the connection source radio base station 200A judges whether or not to execute a handover in consideration of the measurement result reported through the measurement result report signal, usage of radio resources, and the like.

In step 4, the connection source radio base station 200A transmits a handover request signal (Handover Request) to a connection target radio base station (Target eNB) 200B.

The handover request signal is configured to transmit information necessary for the connection target radio base station 200B to execute a handover (including an identifier of a connection target cell, information related to the mobile station, and bearer information, for example).

In step 5, the connection target radio base station 200B judges whether or not to accept the mobile station 100 that is going to perform handover.

When judging that the mobile station 100 is acceptable, the connection target radio base station 200B reserves necessary resources and a cell specific mobile station identifier (C-RNTI: cell specific radio network temporary identifier) that the mobile station 100 uses after switching the connected cell.

In step 6, the connection target radio base station 2003 transmits a handover request acknowledgment signal (Handover Request Acknowledge) to the connection source radio base station 200A.

Here, the handover request acknowledgment signal includes information elements to be transmitted from the connection target radio base station 200B to the mobile station 100, and these information elements are transparently treated by the connection source radio base station 200A.

Concrete examples of the information elements to be transmitted from the connection target radio base station 200B to the mobile station 100 via the connection source radio base station 200A include the cell identifier that the mobile station 100 uses after switching the connected cell, i.e., the C-RNTI, radio related parameters, part of broadcast information of a connection target cell, and the like.

In step 7, the connection source radio base station 200A generates a handover command signal (Handover Command) which includes the above-described information elements having received in step 6 and is to be transmitted from the connection target radio base station 200B to the mobile station 100, and transmits the handover command signal to the mobile station 100.

The mobile station 100 moves on to a handover operation based on the information elements included in the received handover command signal. In step S8, the mobile station 100 establishes downlink synchronization with the connection target radio base station 200B, and transmits an uplink synchronization establishment request signal (Synchronization) to the connection target radio base station 200B in order to establish uplink synchronization with the connection target radio base station 200B.

In step 9, in response to the uplink synchronization establishment request signal, the connection target radio base station 200B transmits a timing information signal including uplink timing information (Timing Advance) and uplink allocation information (UL Grant) to the mobile station 100.

In step 10, after establishing the uplink synchronization, the mobile station 100 transmits a handover completion signal (Handover Confirm) to the connection target radio base station 200B for notification of handover completion.

However, the above-described mobile communication system has a problem of a waste of radio resources and a reduction in radio transmission efficiency.

Non-patent Document 1: 3GPP 36.300 V8.0.0 Technical specification group radio access network; Evolved universal terrestrial radio access (E-UTRA) and Evolved universal terrestrial radio access network (E-UTRAN); Overall description; Stage 2, 10.1.2.1.1

DISCLOSURE OF THE INVENTION

Accordingly, the present invention has been made in view of the above-described problem. An object of the present invention is to provide a handover controlling method, a radio base station and a mobile station which are capable of improving transmission efficiency by notifying a mobile station only of difference information between information set by a connection source radio base station and information set by a connection target radio base station at the time of a handover between the radio base stations and thus avoiding transmitting redundant information.

A first aspect of the present invention is summarized as a handover controlling method for switching a radio base station to which a mobile station is connected from a connection source radio base station to a connection target radio base station, the method including the steps of: generating, at the connection source radio base station, a handover request signal including radio related information retained by the connection source radio base station, and transmitting, from the connection source radio base station to the connection target radio base station, the handover request signal; extracting, at the connection target radio base station, difference information between the radio related information included in the received handover request signal and radio related information set by the connection target radio base station; generating, at the connection target radio base station, a handover request acknowledgment signal for notifying the extracted difference information of the radio related information, and transmitting, from the connection target radio base station to the connection source radio base station, the handover request acknowledgment signal; generating, at the connection source radio base station, a handover command signal for notifying the difference information of the radio related information based on the received handover request acknowledgment signal, and transmitting, from the connection source radio base station to the mobile station, the handover command signal; and updating, at the mobile station, radio related information retained in the mobile station, based on the difference information of the radio related information notified by the received handover command signal.

A second aspect of the present invention is summarized as a handover controlling method for switching a radio base station to which a mobile station is connected from a connection source radio base station to a connection target radio base station, the method including the steps of: generating, at the connection source radio base station, a handover request signal, and transmitting, from the connection source radio base station to the connection target radio base station, the handover request signal; generating, at the connection target radio base station, a handover request acknowledgment signal for notifying radio related information set by the connection target radio base station in response to the received handover request signal, and transmitting, from the connection target radio base station to the connection source radio base station, the handover request acknowledgment signal; extracting, at the connection source radio base station, difference information between the radio related information notified by the received handover request acknowledgment signal and radio related information retained by the connection source radio base station; generating, at the connection source radio base station, a handover command signal for notifying the extracted difference information of the radio related information, and transmitting, from the connection source radio base station to the mobile station, the handover command signal; and updating, at the mobile station, radio related information retained in the mobile station, based on the difference information of the radio related information notified by the received handover command signal.

A third aspect of the present invention is summarized as a radio base station from which a mobile station switches a radio base station connected to the mobile station to a connection target radio base station, including: a radio related information retainer unit configured to retain radio related information on connection between the mobile station and the radio base station; a handover request signal generator/transmitter unit configured to generate a handover request signal including the radio related information retained by the radio related information retainer unit, and to transmit the handover request signal to the connection target radio base station; and a handover command signal generator/transmitter unit configured to generate a handover command signal for notifying difference information between the radio related information retained by the radio related information retainer unit and radio related information set by the connection target radio base station based on a handover request acknowledgment signal received from the connection target radio base station, and to transmit the handover command signal to the mobile station.

In the third aspect, the handover request signal can include measurement related information used in a connection source cell by the mobile station.

A fourth aspect of the present invention is summarized as a radio base station to which a mobile station switches a radio base station connected to the mobile station from a connection source radio base station, including: a radio related information difference extractor unit configured to extract difference information between radio related information that is included in a handover request signal received from the connection source radio base station and is retained by the connection source radio base station, and radio related information set by the radio base station; and a handover request acknowledgment signal generator/transmitter unit configured to generate a handover request acknowledgment signal for notifying the difference information of the radio related information extracted by the radio related information difference extractor unit, and to transmit the handover request acknowledgement signal to the connection source radio base station.

A fifth aspect of the present invention is summarized as a radio base station from which a mobile station switches a radio base station connected to the mobile station to a connection target radio base station, including: a radio related information retainer unit configured to retain radio related information on connection between the mobile station and the radio base station; a handover request signal generator/transmitter unit configured to generate a handover request signal, and to transmit the handover request signal to the connection target radio base station; a radio related information difference extractor unit configured to extract difference information between radio related information that is notified by a handover request acknowledgment signal received from the connection target radio base station and is set by the connection target radio base station, and the radio related information retained by the radio related information retainer unit; and a handover command signal generator/transmitter unit configured to generate a handover command signal for notifying the difference information of the radio related information extracted by the radio related information difference extractor unit, and to transmit the handover command signal to the mobile station.

A sixth aspect of the present invention is summarized as a radio base station to which a mobile station switches a radio base station connected to the mobile station from a connection source radio base station, including: a handover request acknowledgment signal generator/transmitter unit configured to generate a handover request acknowledgment signal for notifying radio related information set by the radio base station in response to a handover request signal received from the connection source radio base station, and to transmit the handover request acknowledgment signal to the connection source radio base station.

In the sixth aspect, the handover request signal can include measurement related information used in a connection source cell by the mobile station.

A seventh aspect of the present invention is summarized as a mobile station configured to switch a connected radio base station from a connection source radio base station to a connection target radio base station, including: a radio related information retainer unit configured to retain radio related information on connection with the connected radio base station; and a radio related information updater unit configured to update the radio related information retained by the radio related information retainer unit based on difference information of radio related information notified by a handover command signal received from the connection source radio base station, wherein the difference information of the radio related information represents a difference between radio related information retained by the connection source radio base station and radio related information set by the connection target radio base station.

As described above, the present invention can provide a handover controlling method, a radio base station and a mobile station which are capable of improving transmission efficiency by notifying a mobile station only of difference information between information set by a connection source radio base station and information set by a connection target radio base station at the time of a handover between the radio base stations and thus avoiding transmitting redundant information.

BEST MODE FOR CARRYING OUT THE INVENTION (Configuration of Mobile Communication System According to First Embodiment of the Present Invention)

A configuration of a mobile communication system according to a first embodiment of the present invention will be described with reference to FIG. 2 to FIG. 7. In this embodiment, a mobile communication system of the LTE scheme will be described as an example of a mobile communication system. However, the present invention is also applicable to mobile communication systems other than the mobile communication system of the LTE scheme.

The configuration of the mobile communication system according to the first embodiment of the present invention will be described with reference to FIG. 2. It is to be noted that constituents having the same function are designated by the same reference numerals throughout the drawings for describing this embodiment and repetitive explanations will be omitted.

Figure 2:
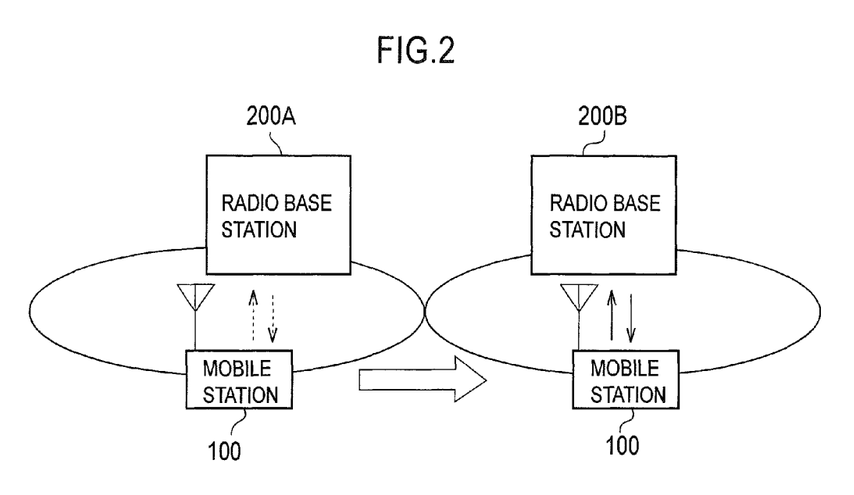
FIG. 2 is an overall configuration diagram of a mobile communication system according to a first embodiment of the present invention.

As shown in FIG. 2, the mobile communication system according to this embodiment includes a mobile station 100, and multiple radio base stations 200A and 200B.

For example, when the mobile station 100 communicating with the radio base station 200A moves beyond an area covered by the radio base station 200A and moves to an area covered by the radio base station 200B, the mobile station 100 executes a handover, in response to an instruction from the connection source radio base station 200A, by switching a radio base station to be connected from the connection source radio base station 200A to the connection target radio base station 200B.

Figure 3:
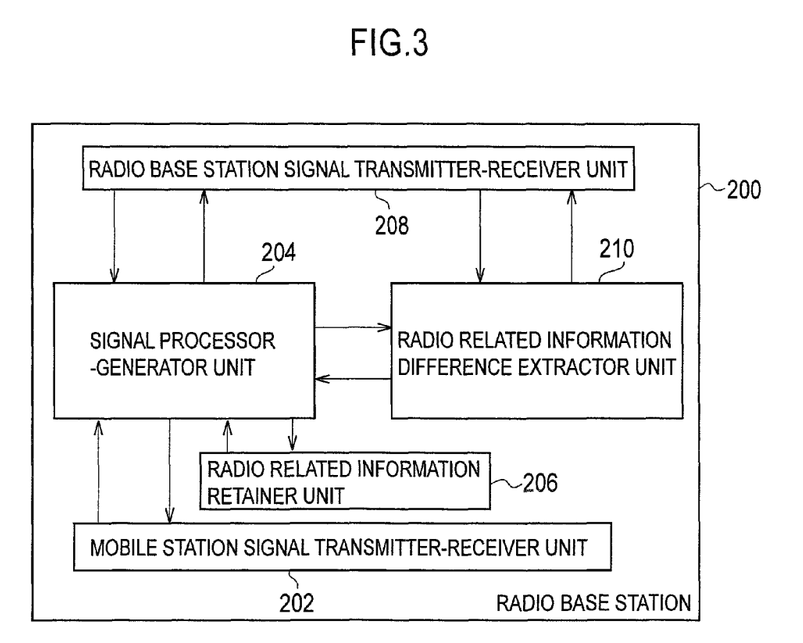
FIG. 3 is a functional block diagram of a radio base station according to the first embodiment of the present invention.

As shown in FIG. 3, the radio base station 200 according to this embodiment includes a mobile station signal transmitter-receiver unit 202, a signal processor-generator unit 204 connected to the mobile station signal transmitter-receiver unit 202, a radio related information retainer unit 206 connected to the signal processor-generator unit 204, a radio base station signal transmitter-receiver unit 208 connected to the signal processor-generator unit 204, and a radio related information difference extractor unit 210 connected to the radio base station signal transmitter-receiver unit 208 and the signal processor-generator unit 204.

The mobile station signal transmitter-receiver unit 202 is configured to receive a measurement result report signal transmitted by the mobile station 100, and to transmit a handover command signal to the mobile station 100.

The signal processor-generator unit 204 is configured to process signals received by the mobile station signal transmitter-receiver unit 202 and the radio base station signal transmitter-receiver unit 208, and to generate signals to be transmitted from the mobile station signal transmitter-receiver unit 202 and the radio base station signal transmitter-receiver unit 208.

For example, the signal processor-generator unit 204 is configured to judge whether to execute a handover based on the measurement result report signal received from the mobile station 100, to execute processing for generating and receiving a handover request signal and a handover request acknowledgment signal, and to generate the handover command signal.

Moreover, the signal processor-generator unit 204 provided in the connection target radio base station 200B is configured to transmit extracted difference information as part of the handover request acknowledgment signal, when the connection target radio base station 200B extracts difference information of radio related information, for example.

Figure 4:
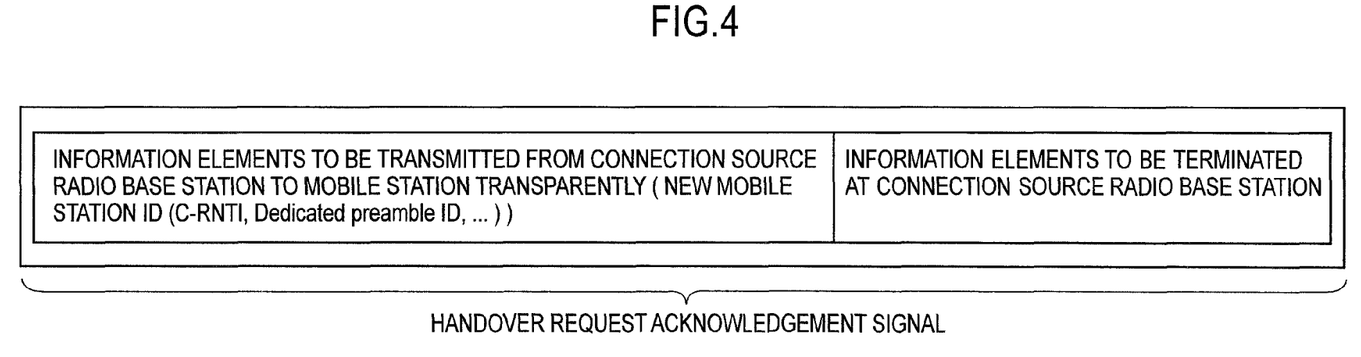
FIG. 4 is a view showing an example of a handover request acknowledgment signal to be used by the mobile communication system according to the first embodiment of the present invention.

Meanwhile, when the handover request acknowledgment signal is divided into a portion to be processed transparently by the connection source radio base station 200A and a portion to be terminated at the connection source radio base station 200A as shown in FIG. 4, the extracted difference information may be included in the portion to be processed transparently.

The radio related information retainer unit 206 is configured to retain radio related information (concerning connection between the mobile station 100 and the radio base station 200) used by the radio base station 200.

Figure 5:
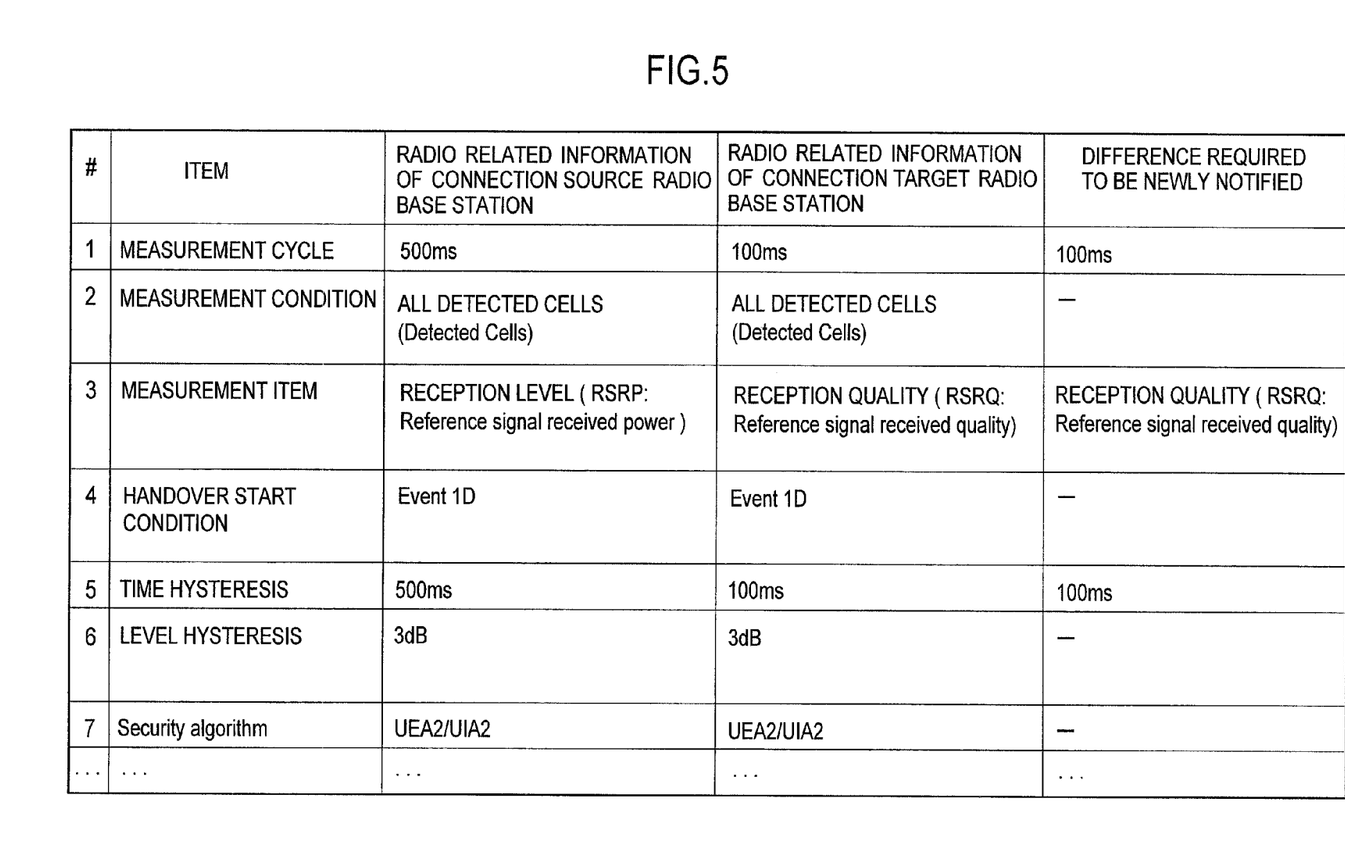
FIG. 5 is a view showing an example of radio related information to be used by the mobile communication system according to the first embodiment of the present invention.

For example, as shown in FIG. 5, the radio related information retainer unit 206 is configured to retain a measurement cycle of a radio status, a measurement condition, a measurement item, a handover start condition, a time hysteresis, a level hysteresis, a security algorithm, peripheral cell information, the number of transmission antennas, a radio resource for a random access channel, scheduling related information, PDCP/RLC/MAC related information, signaling radio bearer information, and the like.

The radio base station signal transmitter-receiver unit 208 is configured to transmit the handover request signal to the connection target radio base station 200B, and to receive the handover request acknowledgment signal from the connection target radio base station 200B, when the radio base station 200 is the connection source radio base station 200A in the handover.

On the other hand, the radio base station signal transmitter-receiver unit 208 is configured to receive the handover request signal from the connection source radio base station 200A, and to transmit the handover request acknowledgment signal to the connection source radio base station 200A, when the radio base station 200 is the connection target radio base station 200B in the handover.

The radio related information difference extractor unit 210 is configured to extract difference information between radio related information used by the connection source radio base station 200A and radio related information used by the connection target radio base station 200B.

For example, the radio related information difference extractor unit 210 is configured to compare the radio related information, which has been used by the connection source radio base station 200A and is included in the handover request signal received from the connection source radio base station 200A, with the radio related information used by the radio base station itself, and to extract information (difference information) representing a difference therebetween as shown in FIG. 5, when the radio base station 200 is the connection target radio base station 200B.

Meanwhile, the radio related information difference extractor unit 210 may be configured to compare the radio related information, which is used by the connection target radio base station 200B and is included in the handover request acknowledgment signal received from the connection target radio base station 200B, with the radio related information used by the radio base station itself, and to extract information (difference information) representing a difference therebetween as shown in FIG. 5, when the radio base station 200 is the connection source radio base station 200A.

Figure 6:
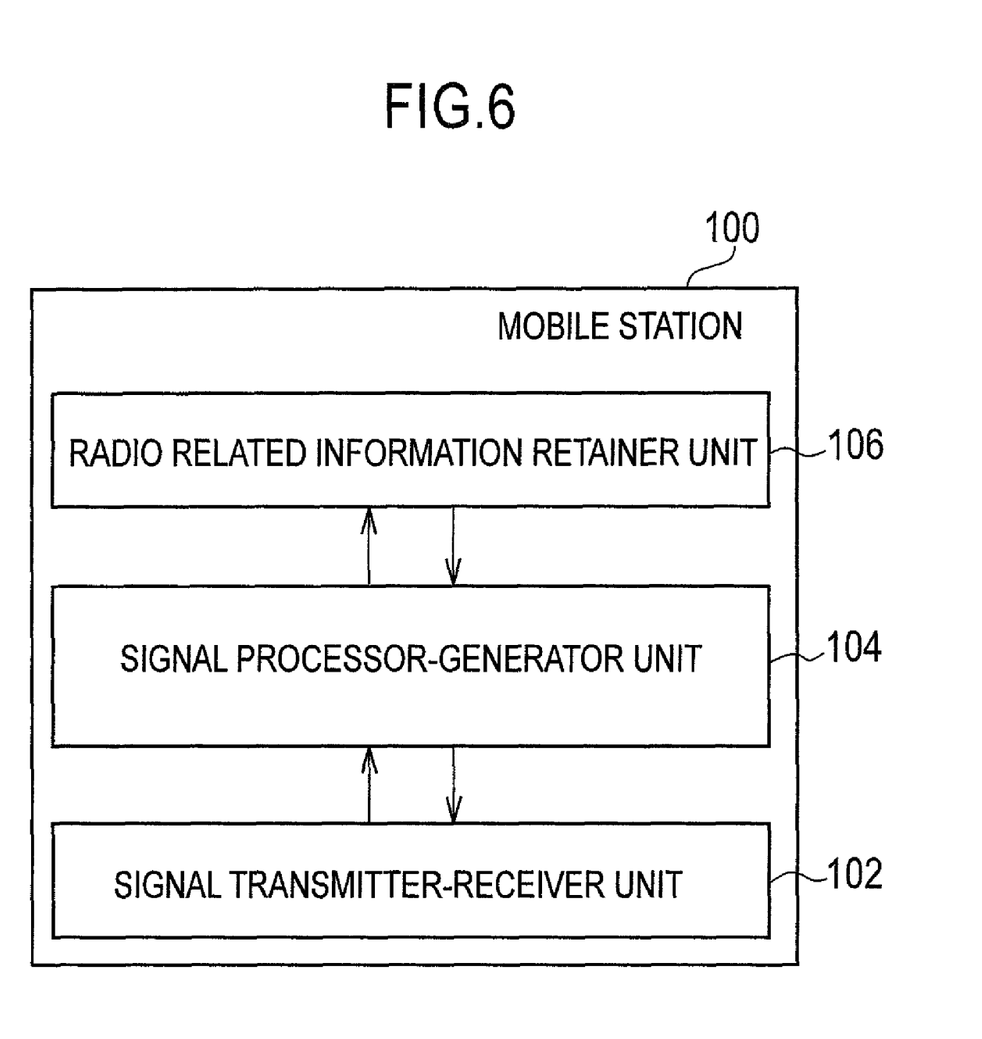
FIG. 6 is a functional block diagram of a mobile station according to the first embodiment of the present invention.

As shown in FIG. 6, the mobile station 100 according to this embodiment includes a signal transmitter-receiver unit 102, a signal processor-generator unit 104 connected to the signal transmitter-receiver unit 102, and a radio related information retainer unit 106 connected to the signal processor-generator unit 104.

The signal transmitter-receiver unit 102 is configured to transmit signals to and receive signals with the radio base station 200.

For example, the signal transmitter-receiver unit 102 is configured to transmit the measurement result report signal to the radio base station 200, and to receive the handover command signal from the radio base station 200.

The signal processor-generator unit 104 is configured to generate signals to be transmitted from the signal transmitter-receiver unit 102, and to process signals received by the signal transmitter-receiver unit 102.

For example, the mobile station 100 is configured to, when receiving the handover command signal from the radio base station 200, execute a handover to a cell instructed by the handover command signal, and to store the radio related information included in the handover command signal in the radio related information retainer unit 106.

The radio related information retainer unit 106 is configured to store the radio related information instructed from the radio base station 200 as part of the handover command signal or broadcast information transmitted by the connected radio base station 200.

For example, the radio related information retainer unit 106 is configured to store the radio related information set by the connection target radio base station 200B based on the radio related information instructed by the handover command signal.

Meanwhile, the radio related information retainer unit 106 may be configured to overwrite the radio related information instructed by the handover command signal as new information, and to continuously store the radio related information used by the handover source radio base station 200A instead of storing part of or all of the radio related information not instructed by the handover command signal.

Meanwhile, the radio related information retainer unit 106 may be configured to receive broadcast information of a connection target cell, and to update the retaining radio related information based on the radio related information instructed as part of the broadcast information.

For example, as shown in FIG. 5, information to be updated as the radio related information may include the measurement cycle of the radio status, the measurement condition, the measurement item, the handover start condition, the time hysteresis, the level hysteresis, the security algorithm, the peripheral cell information, the number of transmission antennas, the radio resource for a random access channel, the scheduling related information, the PDCP/RLC/MAC related information, the signaling radio bearer information, and the like.

(Operation of Mobile Communication System According to First Embodiment of the Present Invention)

An operation of the mobile communication system according to the first embodiment of the present invention will be described with reference to FIG. 7.

Figure 7:
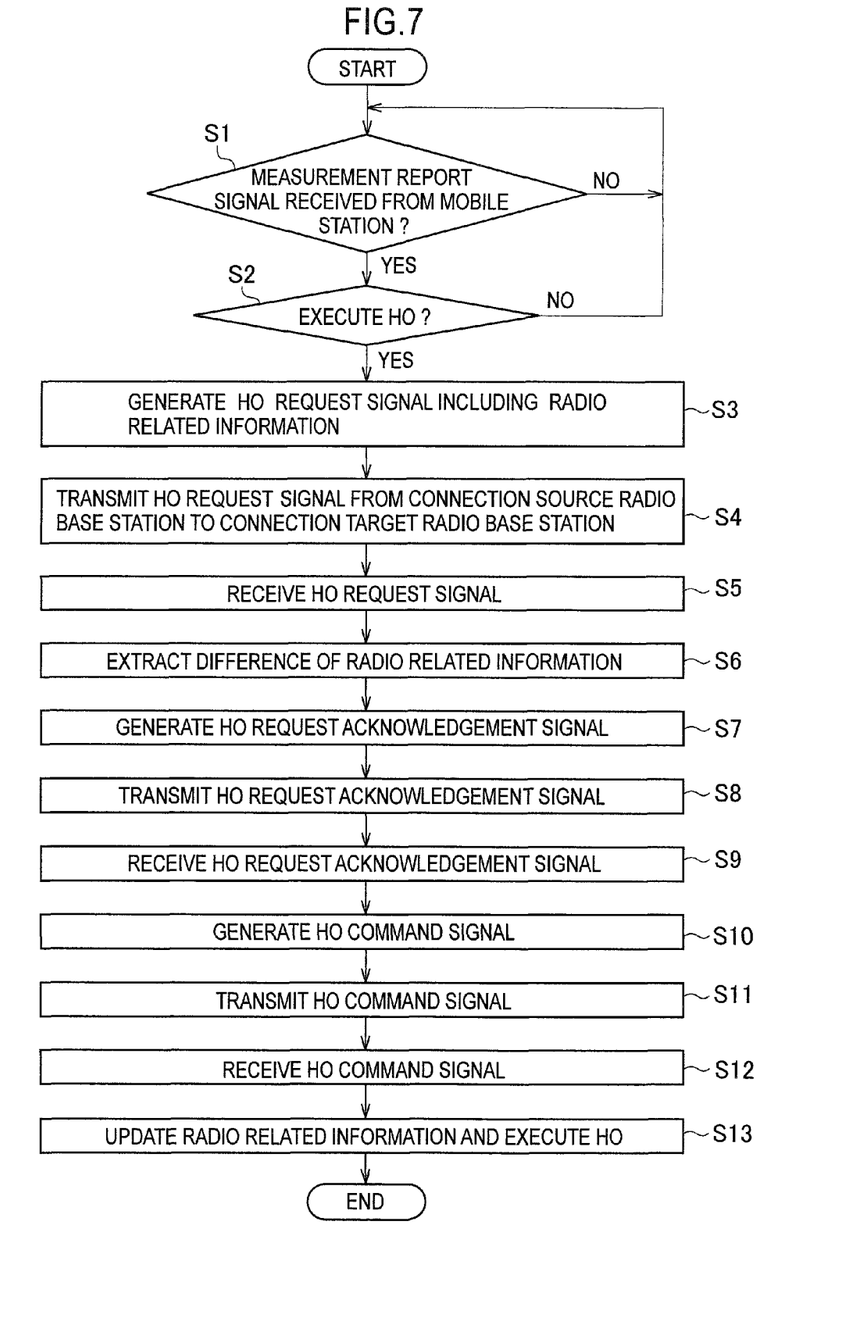
FIG. 7 is a flowchart showing an operation of the mobile communication system according to the first embodiment of the present invention.

As shown in FIG. 7, in STEP 1, the connection source radio base station 200A judges whether or not the connection source radio base station 200A has received the measurement report signal from the mobile station 100.

Here, the operation returns to START, if the connection source radio base station 200A has not received the measurement report signal from the mobile station 100.

When the connection source radio base station 200A has received the measurement report signal from the mobile station 100 in STEP 1, the connection source radio base station 200A judges whether to execute a handover in STEP 2.

The operation returns to START, if a result of judgment as to whether a handover is to be executed in STEP 2 turns out to be "execution unnecessary".

On the other hand, when the result of judgment as to whether a handover is to be executed in STEP 2 turns out to be "execution necessary", the operation goes to STEP 3 in which the connection source radio base station 200A generates a handover request signal including the radio related information used by the radio base station itself.

In STEP 4, the connection source radio base station 200A transmits the generated handover request signal to the connection target radio base station 200B.

In STEP 5, the connection target radio base station 200B receives the handover request signal.

In STEP 6, the connection target radio base station 200B extracts difference information between the radio related information used by the connection source radio base station 200A and the radio related information used by the radio base station itself based on the received handover request signal.

In STEP 7, the connection target radio base station 200B generates a handover request acknowledgment signal based on the difference information of the radio related information thus extracted.

Here, if the connection source radio base station 200A extracts the above-described difference information of the radio related information, the connection target radio base station 200B generates the handover request acknowledgment signal including the radio related information used by the radio base station itself without extracting the above-described difference information of the radio related information.

In STEP 8, the connection target radio base station 200B transmits the generated handover request acknowledgment signal to the connection source radio base station 200A.

In STEP 9, the connection source radio base station 200A receives the handover request acknowledgment signal from the connection target radio base station 200B.

In STEP 10, the connection source radio base station 200A generates a handover command signal based on the received handover request acknowledgment signal.

Here, when the connection source radio base station 200A extracts the above-described difference information of the radio related information, the connection source radio base station 200A extracts difference information between the radio related information, which is used by the connection target radio base station 200B and included in the received handover request acknowledgment signal, and the radio related information used by the radio base station itself, and generates the handover command signal including the extracted difference information of the radio related information.

In STEP 11, the connection source radio base station 200A transmits the generated handover command signal to the mobile station 100.

In STEP 12, the mobile station 100 receives the handover command signal.

In STEP 13, the mobile station 100 updates the radio related information retained by the mobile station itself based on the received handover command signal and thus executes a handover.

(Operation and Effect of Mobile Communication System According to First Embodiment of the Present Invention)

The mobile communication system according to this embodiment is capable of improving transmission efficiency by notifying the mobile station 100 only of difference information between radio related information used by the connection source radio base station 200A and radio related information set by the connection target radio base station 200B at the time of a handover between the radio base stations and thus avoiding transmitting redundant information to the mobile station 100.

Note that the above-described operations of the mobile station UE and radio base station eNB may be implemented by hardware, software modules executed by a processor, or a combination of the hardware and the software modules.

Each software module may be provided in a storage medium of any form, such as a random access memory (RAM), a flash memory, a read only memory (ROM), an erasable programmable ROM (EPROM), an electronically erasable and programmable ROM (EEPROM), a register, a hard disk, a removable disk or a CD-ROM.

The storage medium is connected to a processor so that the processor can read or write information from or into the storage medium. Alternatively, the storage medium may be integrated in a processor. Further, the storage medium and the processor may be provided in an ASIC, and the ASIC may be provided in the mobile station UE and the radio base station eNB. Alternatively, the storage medium and the processor may be provided as discrete components in the mobile station UE and the radio base station eNB.

While the present invention has been described in detail above by using the foregoing embodiment, it is apparent to those skilled in the art that the present invention is not limited to the embodiment described herein. The present invention may be practiced in the form of modifications and variations without departing from the gist and scope of the present invention as defined in the description of the scope of claims.

It is to be therefore understood that the description herein is for the purpose of illustration only and is not intended to limit the present invention.

It is to be noted that the entire contents of Japanese Patent Application No. 2007-212506 (filed on Aug. 16, 2007) are incorporated herein by reference.

INDUSTRIAL APPLICABILITY

As described above, a handover controlling method, a radio base station and a mobile station according to the present invention are capable of improving transmission efficiency by notifying a mobile station only of difference information between information set by a connection source radio base station and information set by a connection target radio base station at the time of a handover between the radio base stations and thus avoiding transmitting redundant information, and are therefore useful.

The invention claimed is:

1. A handover controlling method for switching a radio base station to which a mobile station is connected from a connection source radio base station to a connection target radio base station, the method comprising the steps of:
   generating, at the connection source radio base station, a handover request signal including radio related information retained by the connection source radio base station, and transmitting, from the connection source radio base station to the connection target radio base station, the handover request signal;
   extracting, at the connection target radio base station, difference information between the radio related information included in the received handover request signal and radio related information set by the connection target radio base station;
   generating, at the connection target radio base station, a handover request acknowledgment signal for notifying the extracted difference information of the radio related information, and transmitting, from the connection target radio base station to the connection source radio base station, the handover request acknowledgment signal;
   generating, at the connection source radio base station, a handover command signal for notifying the difference information of the radio related information based on the received handover request acknowledgment signal, and transmitting, from the connection source radio base station to the mobile station, the handover command signal; and
   updating, at the mobile station, radio related information retained in the mobile station, based on the difference information of the radio related information notified by the received handover command signal.

2. A radio base station to which a mobile station switches a radio base station connected to the mobile station from a connection source radio base station, comprising:
   a radio related information difference extractor unit configured to extract difference information between radio related information that is included in a handover request signal received from the connection source radio base station and is retained by the connection source radio base station, and radio related information set by the radio base station; and
   a handover request acknowledgment signal generator/transmitter unit configured to generate a handover request acknowledgment signal for notifying the difference information of the radio related information extracted by the radio related information difference extractor unit, and to transmit the handover request acknowledgement signal to the connection source radio base station.

3. A mobile station configured to switch a connected radio base station from a connection source radio base station to a connection target radio base station, comprising:
- a radio related information retainer unit configured to retain radio related information on connection with the connected radio base station; and
- a radio related information updater unit configured to update the radio related information retained by the radio related information retainer unit based on difference information of radio related information notified by a handover command signal received from the connection source radio base station, wherein the difference information of the radio related information represents a difference between radio related information retained by the connection source radio base station and radio related information set by the connection target radio base station.

* * * * *